United States Patent [19]
Takamichi

[11] Patent Number: 6,084,857
[45] Date of Patent: Jul. 4, 2000

[54] CELL RATE SUPERVISING APPARATUS

[75] Inventor: Toru Takamichi, Tokyo, Japan

[73] Assignee: NEC Corporation, Tokyo, Japan

[21] Appl. No.: 08/916,162

[22] Filed: Aug. 21, 1997

[30] Foreign Application Priority Data

Aug. 30, 1996 [JP] Japan ................................. 8-230433

[51] Int. Cl.$^7$ ........................ G01R 31/08; G06F 11/00; G08C 15/00
[52] U.S. Cl. ........................ 370/236; 370/230; 370/232; 370/409
[58] Field of Search .................................. 370/230, 229, 370/231, 232, 233, 234, 235, 236, 395, 397, 398

[56] References Cited

U.S. PATENT DOCUMENTS 5,777,984  7/1998  Gun et al. ............................. 370/230

FOREIGN PATENT DOCUMENTS 9-107364  4/1997  Japan .
10-32588  2/1998  Japan .

OTHER PUBLICATIONS

Yamato K et al., "Congestion Control for ABR Service Based on Dynamic UPC/NPC IEICE Transactions on Communications", vol.. E79–B, No. 2, Feb. 1, 1996, pp. 142–152.

Adams J L et al., "The Support of the Available Bit Rate Bearer Capability Using Virtual Resource/Destination Concepts", by Technology Journal, vol.. 13, No. 3, Jul. 1, 1995, pp. 67–79.

"The ATM Forum Technical Committee: Traffic Management Specification Version 4.0", Apr. 1996, pp. 92–96.

Traffic Management Specification Version 4.0, The ATM Forum, Mar. 1996.

*Primary Examiner*—Huy D. Vu
*Assistant Examiner*—M. Phan
*Attorney, Agent, or Firm*—Laff, Whitesel & Satet, Ltd.; J. Warren Whitesel

[57] ABSTRACT

A BRM changing circuit 4 that changes congestion information of a BRM cell is disposed on the output side of a down line (from the network side to the user side) of a cell rate supervising apparatus. The BRM changing circuit 4 places an ACR value calculated by an ACR calculating circuit 3 with congestion information (a CI bit, an NI bit, and an ER area) in a BRM cell received from the network through the down line to the ER area of the BRM cell. The resultant BRM cell that has been changed by the BRM changing circuit 4 is sent to the user side terminal unit through the down line.

8 Claims, 8 Drawing Sheets

CELL RATE SUPERVISING APPARATUS

BACKGROUND OF THE INVENTION

1. Field of the Invention

The present invention relates to a supervising apparatus of an ABR (Available Bit Rate) network of an ATM transmission network, in particular, to a cell rate supervising apparatus of ATM cells of an UNI (User-Network Interface) and an NNI (Network Node Interface) of an ABR network.

2. Description of the Related Art

In recent years, as an important technology that accomplishes a B-ISDN (Broad-band Integrated Service Digital Network), an ATM (Asynchronous Transfer Mode) is becoming attractive.

In the ATM network, various service classes are defined depending on transmission rates. Examples of the service classes are a CBR (Constant Bit Rate) service, a VBR (Variable Bit Rate) service, and a UBR (Unspecified Bit Rate) service. In the CBR service, a predetermined fixed transmission band is reserved for a connection between terminal units so that the transmission rate is always constant. In the VBR service, the transmission band is defined with a parameter that is statistically represented and the transmission rate varies in a reserved band. In the UBR service, no transmission band is specifically defined. Recently, an ABR (Available Bit Rate) service is becoming attractive. In the ABR service, no band is reserved. A connection that uses the network shares a blank band. As the transmission rate of the connection, an MCR (Minimum Cell Rate) is assured. In the ABR service, the transmission rate varies between the MCR and the PCR (Peak Cell Rate).

The ABR service is accomplished in such a manner that a user terminal unit increases or decreases a cell transmission rate corresponding to congestion information that is fed back from the network to the user terminal.

FIG. 5 is a schematic diagram for explaining the theory of operation of the ABR service. In FIG. 5, reference numerals 6 and 8 are user terminal units (denoted by ES: End-Systems). Reference numeral 7 is a network unit such as a switch (SW) or a cross connect unit (denoted by XC). A line connected from the user terminal unit 6 to the user terminal unit 8 is referred to as an up line. A line connected from the user terminal unit 8 to the user terminal unit 6 is referred to as a down line. When a data cell is sent from a particular terminal unit to another terminal unit, the orientation of the data cell is referred to as the forward direction. The reverse direction is referred to as the backward direction. When a data cell is sent from the user terminal unit 6 to the user terminal unit 8, the direction of the up line is the forward direction and the direction of the down line is the backward direction. In contrast, when a data cell is sent from the user terminal unit 8 to the user terminal unit 6, the direction of the down line is the forward direction and the direction of the up line is the backward direction.

Assuming that a data cell is sent from the terminal unit 6 to the terminal unit 8, the terminal unit 6 sends the cell to the up line at an ACR (Allowed Cell Rate) or less. At this point, one FRM (Forward-direction Resource Management) cell is sent whenever Nrm (=32) cells are sent. The terminal unit 8 extracts an FRM cell from cells received through the up line and sends a BRM (Backward-direction Resource Management) cell that is the FRM cell sent back to the down line to the terminal unit 6. At this point, the terminal unit 8 may place circuit information thereof as congestion information in the BRM cell.

The network unit 7 places congestion situation of the network as congestion information in the FRM cell or BRM cell. The terminal unit 6 extracts the congestion information from the BRM cell received through the down line, changes the ACR value thereof corresponding to the congestion information, and sends a cell stream with the new ACR value to the up line.

FIG. 6 is a schematic diagram showing a cell format of an RM cell. The cell format of the FRM cell is the same as the cell format of the BRM cell. The FRM cell and the BRM cell are i distinguished with a DIR (Direction) bit (where 0: forward direction, 1: backward direction). A CI (Congestion Identifier) bit, an NI (No-Increase) bit, and an ER (Explicit Rate) area of the cell format can be used for congestion information that the terminal unit 8 or the network unit 7 sends to the user terminal unit 6. When no congestion takes place, the receiving terminal unit and the terminal unit can set "0" to the CI bit. When congestion takes place, the receiving terminal unit and the terminal unit can set "1" to the CI bit. When the user terminal unit can increase the cell transmission rate due to absence of congestion, the receiving terminal unit and the network unit can set "0" to the NI bit. When the user terminal unit cannot increase the cell transmission rate due to presence of congestion, the receiving terminal unit and the network unit can set "1" to the NI bit. When the network unit directly designates a real rate value as the cell transmission rate of the user terminal unit, the network unit can place the rate value to the ER area as an explicit rate value. In the network unit such as an SW and an XC, when "1" has been set to the CI bit of the FRM cell or BRM cell received through the up line or the down line, "0" cannot be set to the CI bit. Likewise, when "1" has been set to the NI bit, "0" cannot be set to the NI bit.

The ABR service can be categorized as two types that are a binary mode and an ER mode depending whether the network places congestion information to the CI bit, the NI bit, or the ER area. In the binary mode, the network unit places the congestion information in only CI bit or NI bit and the PCR in the ER area. In the ER mode, the network unit places the calculated ER value in the ER area. Thus, in the ER mode, the CI bit and the NI bit are not used.

The operation of the terminal unit that supports the ABR service is provided as source operation provisions. The update method of the allowed rate ACR value of the terminal unit is provided whether the CI bit of the received BRM cell is 0 or 1, whether the NI bit is 0 or 1, whether or not there is information to be sent, and whether or not the BRM cell is received. Assuming that the ACR value at the present time is denoted by ACR_cur, the difference to the ACR_cur is finely provided. When the difference is denoted by $\delta$ACR, the ACR value is given by the following formula.

$$ACR=\min(ACR\_cur+\delta ACR, ER) \qquad (1)$$

The source operation provisions of the terminal unit support both the binary mode and the ER mode (see "Traffic Management Specification," The ATM Forum, Ver 4.0 R11, March 1996, Paragraph 5.10.4, p. 45).

FIG. 7 is a block diagram showing an example of the structure of the terminal unit 6. The terminal unit 6 comprises a send data signal information source 9, a cell assembling circuit 10, cell buffers 11 and 12, a cell disassembling circuit 13, a BRM cell extracting circuit 14, an FRM cell extracting circuit 15, an FRM cell creating circuit 16, a BRM cell creating circuit 17, and an RM cell inserting circuit 18. All cells received from the cell buffer 12 are disassembled by the cell disassembling circuit 13. The BRM cell extracting circuit 14 detects a BRM cell corresponding to the output signal of the cell disassembling circuit 13. The BRM cell extracting circuit 14 overwrites the position of the BRM cell with a bit pattern of a idle cell. The FRM cell extracting circuit 15 detects an FRM cell and overwrites the position of the FRM cell with a bit pattern of a idle cell. With the output signal of the FRM cell extracting circuit 15, a signal sequence of the received data can be obtained.

The BRM cell creating circuit 17 sets "1" to the DIR bit of the bit pattern of the FRM cell extracted by the FRM cell extracting circuit 15 and creates a BRM cell that is output from the terminal unit 6 to the up line. The FRM cell creating circuit 16 creates an FRM cell to be output from the terminal unit 6 to the up line. The cell assembling circuit 10 assembles ATM cells with send data signal created by the send data signal source 9. The RM cell inserting circuit 18 inserts the FRM cell created by the FRM cell creating circuit 16 and the BRM cell created by the BRM cell creating circuit 17 in an ATM cell stream. Thus, the cell stream is sent from the terminal unit 6 to the up line. The cell stream is stored in the cell buffer 11.

An ACR calculating circuit 3 calculates a new ACR value with the CI bit, the NI bit, and the ER value of the BRM cell extracted by the BRM cell extracting circuit 14 corresponding to the source operation provisions. The ACR value is sent to the cell buffer 11. The cell buffer 11 sends a cell with the ACR value or a smaller value. Thus, the cell transmission rate of the up line of the terminal unit 6 satisfies the source operation provisions.

However, when the ACR calculating circuit 3 or the cell buffer 11 of a particular user terminal unit gets defective or the user terminal is set so that the source operation provisions thereof are not satisfied, if cells are sent at an excessive transmission rate, the band of the user terminal unit 6 becomes excessively large. Thus, the bands of the other user terminal units that comply with the source operation provisions are restricted. Thus, an unfair situation takes place between the violated terminal unit and the other terminal units. In addition, the violated traffic of the violated terminal unit may cause congestion in the network, resulting in deteriorating the network quality. To prevent that, a cell rate supervising apparatus that has a policing function that supervises and controls whether each user terminal unit sends cells in the range of the source operation provisions.

As policing calculating algorithms that supervise cell rates in the CBR and VBR services, GCRA (Generic Cell Rate Algorithm), VSA (Virtual Scheduling Algorithm), and CSLBA (Continuous-State Leaky Bucket Algorithm) are known. An UPC (Usage Parameter Control) unit supervises an excessive traffic in the UNI (User-Network Interface) with such an algorithm. An NPC (Network Parameter Control) unit supervises an excessive traffic in the network with the NNI (Network-Node Interface).

Likewise, to supervise the cell rate of the ABR service, DGCRA (Dynamic-GCRA) has been proposed as a policing calculating algorithm.

In the ABR service network, to divide the network in the middle thereof, a VS/VD (Virtual Source/Virtual Destination) unit that is a virtual sending/receiving terminal unit can be disposed (see "Traffic Management Specification," The ATM Forum, Ver. 4.0 R11, March 1996, Paragraph 5.10.7, p. 48). The DGCRA can be used for policing the cell traffic of not only the user terminal unit, but the VS/VD unit. In the following description, for simplicity, the policing of the cell traffic of the user terminal unit will be explained. However, this discussion is applied for the case that the cell traffic of the VS/VD unit is policed.

FIG. 8 is a block diagram showing an example of the structure of a cell rate supervising apparatus with the DGCRA. A DGCRA calculating circuit is disposed as a policing calculating circuit 1. With the DGCRA calculating circuit, the user terminal unit 6 polices cells to be sent to the up line.

The DGCRA calculating circuit is composed of a policing rate PACR calculating circuit 20 and a rate comparing circuit 21. In FIG. 8, reference numeral 2 is a BRM cell detecting circuit. Reference numeral 3 is an ACR calculating circuit. Reference numeral 5 is a non-conforming cell processing circuit. Reference numerals 22 and 23 are BRM cells. Reference numeral 23 is a BRM cell 22 received by the cell rate supervising apparatus 19 and sent to the terminal unit 6 through the down line. Thus, the BRM cell 22 is the same as the BRM cell 23. Reference numeral 24 is a cell to be policed.

When the cell rate supervising apparatus 19 receives a cell from the down line, the cell rate supervising apparatus 19 sends the cell to the terminal unit 6 as it is. In addition, the BRM cell detecting circuit 2 determines whether or not the received cell is a BRM cell. When the received cell is a BRM cell like the BRM cell 22, the ACR calculating circuit 3 calculates a new ACR value of the received cell with the CI bit, the NI bit, and the ER value that are the congestion information of the received cell. The policing rate PACR calculating circuit 20 calculates the policing rate PACR with the ACR value. The rate comparing circuit 21 compares the PCAR value with the cell rate of the cell received by the terminal unit 6 through the up line. When the transmission rate of the cell is smaller than the PACR value, the rate comparing circuit 21 determines that the cell is a conforming cell. In contrast, when the transmission rate of the cell is larger than the PACR value, the rate comparing circuit 21 determines that the cell is a non-conforming cell. The non-conforming cell processing circuit 5 passes a cell that has been determined as a conforming cell by the rate comparing circuit 21. The non-conforming cell processing circuit 5 discards a cell that has been determined as a non-conforming cell by the rate comparing circuit 21 or places a tag thereto.

The ACR calculating circuit 3 calculates a new ACR value with the CI bit, the NI bit, and the ER value of the BRM cell 22. Likewise, the ACR calculating circuit 3 of the terminal unit 6 calculates a new ACR value with the CI bit, the NI bit, and the ER value of the BRM cell. Since the BRM cell 22 has the same CI bit, NI bit, and ER value as those of the BRM cell 23, the ACR value of the BRM cell calculated by the ACR calculating circuit 3 in the cell rate supervising apparatus 19 is the same as the ACR value of the BRM cell 23 calculated by the terminal unit 6.

To determine whether or not the cell transmission rate of the user terminal unit 6 is a rate value within the ACR value calculated by the user terminal unit 6, the cell rate supervising apparatus 19 applies the ACR value calculated by the ACR calculating circuit 3 of the cell rate supervising apparatus 19 to the policing rate PACR. After the BRM cell 23 sent from the cell rate supervising apparatus 19 to the down line is received by the terminal unit 6, the ACR value is changed. Assuming that time of which a cell is sent from the terminal unit 6 to the up line with the new ACR value and then received by the cell rate supervising apparatus 19 is denoted by t2, to apply the ACR value calculated by the ACR calculating circuit 3 of the cell rate supervising apparatus 19 to the policing rate PACR, it is necessary to wait for time t2 after the cell rate supervising apparatus 19 sends the BRM cell 23. To calculate the PACR value considering time t2 of the policing rate PACR calculating circuit 20, methods termed algorithm A and algorithm B have been proposed (see "Traffic Management Specification," The ATM Forum, Ver. 4.0 R11, March 1996, Appendix III, p. 92).

When the related art reference shown in FIG. 8 is applied to the ABR service of the binary mode, if the BRM cell 23 is discarded and thereby lost on the down line between the cell rate supervising apparatus 19 and the terminal unit 6, the ACR value calculated by the ACR calculating circuit 3 of the cell rate supervising apparatus 19 does not match the ACR value calculated by the terminal unit 6. Assuming that the ACR value calculated by the ACR calculating circuit 3 of the cell rate supervising apparatus 19 is denoted by ACRp and that the ACR value calculated by the terminal unit 6 is denoted by ACRs, the relation of ACRp=ACRs is satisfied. When the CI bit of the BRM cell 23 is 1, the ACR calculating circuit 3 of the cell rate supervising apparatus 19 decreases the ACRp. However, since the BRM cell 23 is lost, the congestion information of CI bit=1 is not sent to the terminal unit 6. In the terminal unit 6, ACRs is not changed and the situation of ACRP<ACRs takes place.

In the binary node, since only relative congestion information of one bit is sent, the situation of which ACRP does not match ACRs continues until both the values of ACRP and ACRs become MCR or PCR.

Thus, there is a difference between the policing rate PACR of the cell rate supervising apparatus 19 and the cell transmission rate of the terminal unit 6. Consequently, the cell rate supervising apparatus 19 cannot accurately police cells. For example, when ACRp<ACRs, since the policing rate PACR of the cell rate supervising apparatus 19 is smaller than the cell transmission rate of the terminal unit 6, the cell rate supervising apparatus 19 may treat a cell to be determined as a conforming cell as a non-conforming cell. Thus, the terminal unit 6 has a disadvantage. In contrast, when ACRp>ACRS, since the policing rate PACR of the cell rate supervising apparatus 19 is larger than the cell transmission rate of the terminal unit 6, the policing calculating circuit 1 may treat a cell to be determined as a non-conforming cell as a conforming cell. Thus, the network has a disadvantage. This situation continues until the values of ACRp and ACRs become MCR or PCR.

SUMMARY OF THE INVENTION

An object of the present invention is to provide a cell rate supervising apparatus for use with an ABR service of a binary mode and for allowing the policing rate thereof to match an ACR value calculated by a user terminal unit so as to normally police a cell and solve a disadvantage of the user or the network even if a BRM cell is lost between the cell rate supervising apparatus and the user terminal unit on a down line and thereby there is a difference between the rate value used as the policing rate in the cell rate supervising apparatus and the ACR value calculated by the user terminal unit and the user or the network has a disadvantage.

A first aspect of the present invention is a cell rate supervising apparatus for use with an ABR (Available Bit Rate) service of an ATM (Asynchronous Transfer Mode) network, comprising a policing calculating circuit for policing a cell traffic of a up line connected from the user side to the network side, a BRM cell detecting circuit for detecting a BRM (Backward direction Resource Management) cell on a down line connected from the network side to the user side, an ACR calculating circuit for calculating a rate value ACRp (Allowed Cell Rate) with a rate value of a CI (Congestion Identification) bit, an NI (No-Increase) bit, and an ER (Explicit Rate) area that are congestion information received from the BRM cell detecting circuit when the BRM cell detecting circuit detects the BRM cell, a BRM cell changing circuit for overwriting the ER area of the BRM cell detected by the BRM cell detecting circuit with the rate value ACRp calculated by the ACR calculating circuit and sending cells including the overwritten BRM cell to the user terminal through the down line, and a non-conforming cell processing circuit for performing a predetermined process for a non-conforming cell as a result of the policing calculation of the policing calculating circuit, wherein the policing calculating circuit determines a policing rate PACR (Policing Allowed Cell Rate) value with the ACRp value.

The cell rate supervising apparatus according to the present invention places a rate value in an ER area of a BRM cell sent to a down line. The rate value is used to calculate a policing rate PACR value of the cell rate supervising apparatus. The cell rate supervising apparatus has a BRM cell changing circuit that overwrites congestion information of the CI bit, the NI bit, and the ER area of an BRM cell sent from the cell rate supervising apparatus to the user terminal unit through the down line.

The rate value calculated by the ACR calculating circuit of the cell rate supervising apparatus depends on the congestion state of the network. When the rate value is placed in the ER area of the BRM cell sent from the cell rate supervising apparatus, a virtual ER value can be sent to the us terminal unit in addition to one bit information of the CI bit and the NI bit as congestion information. In other words, in the user terminal unit, the ER area of the BRM cell seems as the ER value placed by a network unit such as an SW and an XC. Thus, the region from the cell rate supervising apparatus to the user terminal unit can be virtually treated as an ABR service of the ER mode.

Assuming that a terminal unit is disposed on the user side, that the ACR value calculated by the ACR calculating circuit is denoted by ACRp, that the new ACR value calculated in the terminal unit is denoted by ACRs, and that the current ACR value in the terminal unit is denoted by ACRs_cur, the relation of ACRs=min(ACR_cur+δACR, ACRP) is satisfied with the formula (1). Since ACRs_cur+δACR and ACRP are calculated corresponding to the source operation provisions, normally both the valued are equal. Thus, the relation of ACRp=ACRs is satisfied.

Even if a BRM cell is lost in a region between the cell rate supervising apparatus and the user terminal unit on the down line and thereby the situation of which ACRp does not match ACRs takes place, when ACRp is smaller than the rate control result (ACRs_cur+δACR) with the CI bit and the NI bit of the next BRM cell, the relation of ACRs=ACRp is obtained. In other words, when ACRp is smaller than the rate control result (ACRs_cur+δACR) with the CI bit and the NI bit, the situation of which ACRp does not match ACRs can be solved by the next BRM cell. Thus, the conventional problem of the structure shown in FIG. 8 of which such a situation is not solved until both ACRP and ACRs becomes PCR or MCR does not take place.

Thus, even if the user side or the network side has a disadvantage due to the situation of which the policing rate PACR of the cell rate supervising apparatus does not match the cell transmission rate of the terminal unit, a BRM cell preceded by the lost BRM cell may allow the PACR to match the cell transmission rate of the user terminal unit. Thus, the situation of the related art reference shown in FIG. 8 which the user or network has a disadvantage that continues until both ACRP and ACRs become MCR or PCR can be suppressed.

For example, assuming that ACRp=ACRs=50 Mbps and a BRM cell of which CI bit=1 is received by the cell rate supervising apparatus causes ACRP to become 40 Mbps, if the BRM cell is lost in a region between the cell rate supervising apparatus and the user terminal unit on the down line, ACRp becomes 40 Mbps and ACRs becomes 50 Mbps. Thus, the situation of which ACRP does not match ACRs takes place. Assuming that the next BRM cell of which CI bit=1 causes ACRp to become 30 Mbps, when the BRM cell is received by the user terminal unit, the rate value of 30 Mbps placed in the ER area causes ACRP (=30 Mbps) to become ACRs (=30 Mbps).

A second aspect of the present invention is a cell rate supervising apparatus for use with an ABR service of an ATM network, comprising a policing calculating circuit using DGCRA and is composed of an algorithm A calculating circuit and a rate comparing circuit, a non-conforming cell processing circuit, a BRM cell detecting circuit, an ACR calculating circuit, and an ER area changing circuit, wherein the BRM cell detecting circuit identifies the connection number of a cell received on a down line with the cell header and payload portion of the cell, determines whether or not the cell is a BRM cell, reads an CI bit, an NI bit, and an ER area of the received cell when the cell is the BRM cell, outputs resultant signals to the ACR calculating circuit, and outputs the cell received on the down line to the ER area changing circuit as it is, wherein the ACR calculating circuit calculates an ACR value of the connection of a cell to be policed and passed through the cell rate supervising apparatus corresponding to predetermined source operation provisions provided in "Traffic Management Specification," The ATM Forum, Ver 4.0 R11 or a rate control portion thereof, calculates the ACR value of the connection number of the BRM cell with the CI bit, NI bit, and ER area of the cell when the cell detected by the BRM cell detecting circuit is a BRM cell, and outputs the calculated ACR value, wherein the ER area changing circuit sends a cell received from the BRM cell detecting circuit in such a manner that cell intervals at the time that the BRM cell was received by the BRM cell detecting circuit are kept and that the header portion and the payload portion of the cell are not changed, creates the BRM cell of which the ACR value of the connection of the BRM cell received from the ACR calculating circuit to the ER area of the BRM cell only when the cell received from the BRM cell detecting circuit is the BRM cell, and sends the resultant BRM cell to the source side terminal unit through the down line, wherein the algorithm A calculating circuit stores time tb of which the BRM cell is sent from the ER area changing circuit to the down line and the ACR value placed in the ER area of the BRM cell and calculates a policing rate value PACR of the connection of the received cell with the stored tb and ACR value when the cell is received by the rate comparing circuit through the up line, wherein the rate comparing circuit receives the cell from the up line, identifies the connection number with the cell header of the cell, detects the cell rate of the connection with the cell intervals of the received cells of the connection, compares the cell rate with the policing rate value PACR calculated by the algorithm A calculating circuit, determines that the received cell is a conforming cell when the cell rate is smaller than PACR, and determines that the received cell is a non-conforming cell when the cell rate is larger than PACR, and wherein the non-conforming cell processing circuit sends the cell to the network unit through the up line when the determined result of the rate comparing circuit is a conforming cell, changes the value of the CI bit of the cell to "1", places a tag to the cell, and sends the resultant cell to the network unit through the up line or discards the cell and sends a idle cell or the like to the network unit through the up line when the determined result of the rate comparing circuit is a non-conforming cell.

A third aspect of the present invention is a cell rate supervising apparatus of the second aspect, further comprising an algorithm B calculating circuit, and a CI bit, NI bit, and ER area changing circuit, wherein the algorithm B calculating circuit and the CI bit, NI bit, and ER area changing circuit are disposed instead of the algorithm A calculating circuit and the ER area changing circuit, respectively, wherein the algorithm B calculating circuit calculates a policing rate PACR value of the connection of a BRM cell with time tb of which the BRM cell is sent from the CI bit, NI bit, and ER area changing circuit to the down line and the ACR value overwritten to the ER area of the BRM cell, stores the policing value PACR of each connection, reads the PACR value of the connection from the stores PACR values, and sends the obtained PACR value to the rate comparing circuit, and wherein the CI bit, NI bit, and ER area changing circuit sends a cell to the down line in such a manner that cell intervals at the time that the BRM cell was received by the BRM cell detecting circuit 2 are kept and that the header portion and payload portion of the cell are not changed, overwrites the ACR value of the connection of the BRM cell received from the ACR calculating circuit to the ER area of the BRM cell, forcedly places "0" to both or either the CI bit or the NI bit, and sends the resultant BRM cell to the source side terminal unit.

These and other objects, features and advantages of the present invention will become more apparent in light of the following detailed description of best mode embodiments thereof, as illustrated in the accompanying drawings.

DESCRIPTION OF PREFERRED EMBODIMENTS

Next, with reference to the accompanying drawings, an embodiment of the present invention will be described.

Figure 1:
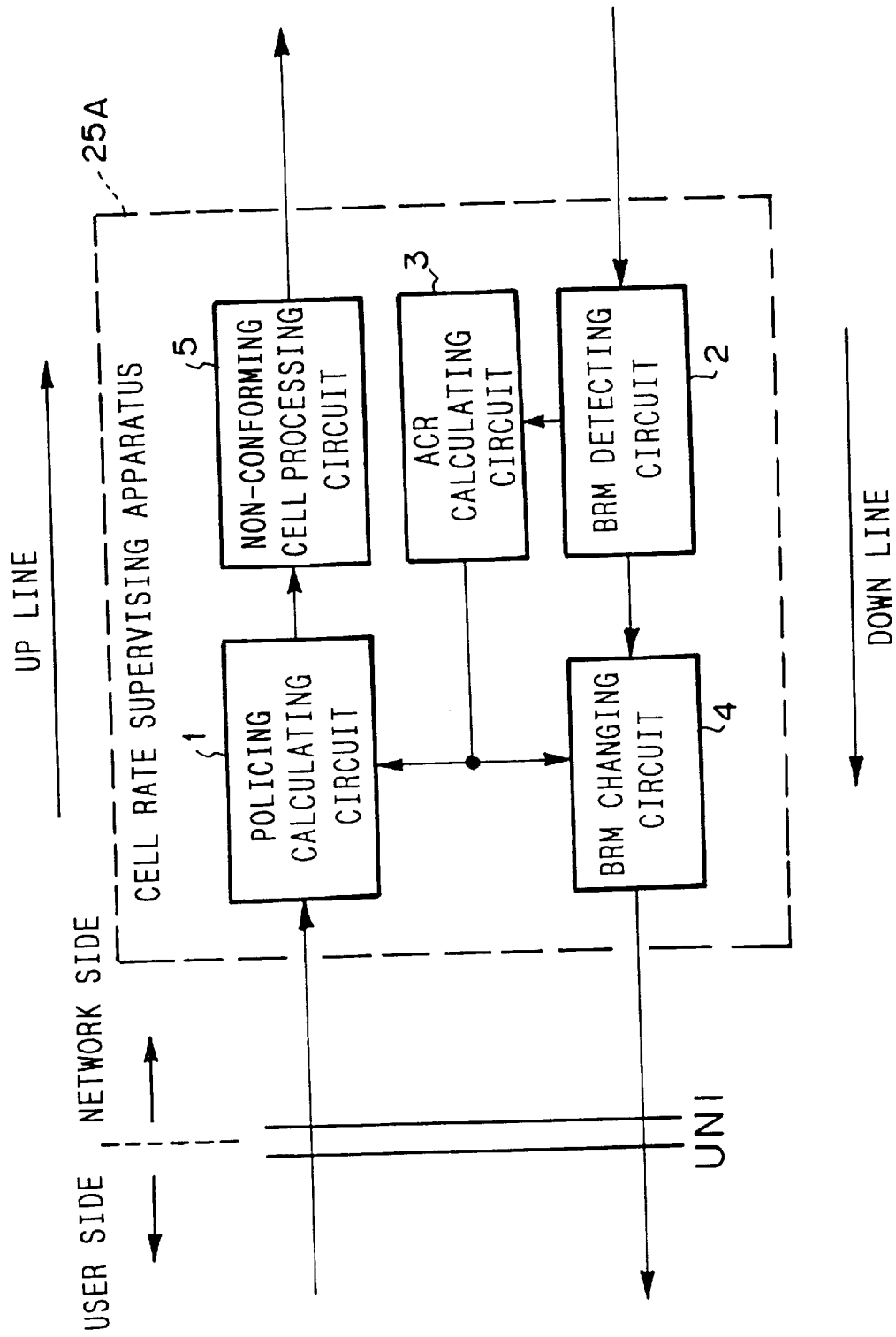
FIG. 1 is a block diagram showing the structure of a cell rate supervising apparatus according to a first embodiment of the present invention.

FIG. 1 is a block diagram showing the structure of a cell rate supervising apparatus according to a first embodiment of the present invention.

A cell rate supervising apparatus 25A according to the embodiment of the present invention comprises a policing calculating circuit 1, a BRM cell detecting circuit 2, an ACR calculating circuit 3, a BRM cell changing circuit 4, and a non-conforming cell processing circuit 5. The policing calculating circuit 1 polices a cell traffic on a up line (from the user side to the network side). The BRM cell detecting circuit 2 detects a BRM cell on a down line (from the network side to the user side). The ACR calculating circuit 3 calculates a rate value ACRp corresponding to congestion information with a CI bit, an NI bit, and an ER area of the BRM cell received from the BRM cell detecting circuit 2. The BRM cell changing circuit 4 places any rate value in the ER area of the BRM cell. The non-conforming cell processing circuit 5 processes a non-conforming cell.

When the BRM cell detecting circuit 2 receives a cell through the down line, it checks the header portion and payload portion of the cell and determines whether or not the cell is a BRM cell. When the received cell is a BRM cell, the ACR calculating circuit 3 calculates a rate value ACR with the CI bit, the NI bit, and the ER area of the BRM cell. The ACR calculating circuit 3 supplies the rate value ACR to the policing calculating circuit 1 and the BRM cell changing circuit 4.

The BRM cell changing circuit 4 overwrites the ER area of the payload portion of the BRM cell detected by the BRM cell detecting circuit 2 with the ACR value received from the ACR calculating circuit 3. The BRM changing circuit 4 sends a cell stream including the BRM cell of which the ER area has been overwritten with the ACR value to the user terminal unit through the down line while cell intervals at the time that the BRM cell was received by the BRM cell detecting circuit 2 are kept.

The policing calculating circuit 1 determines the policing rate PACR values with the ACR value and performs a policing calculation for the received cell so as to determine whether the received cell is a conforming cell or a non-conforming cell. The non-conforming cell processing circuit 5 performs a discarding and tag-placing process for the non-conforming cell.

Figure 2:
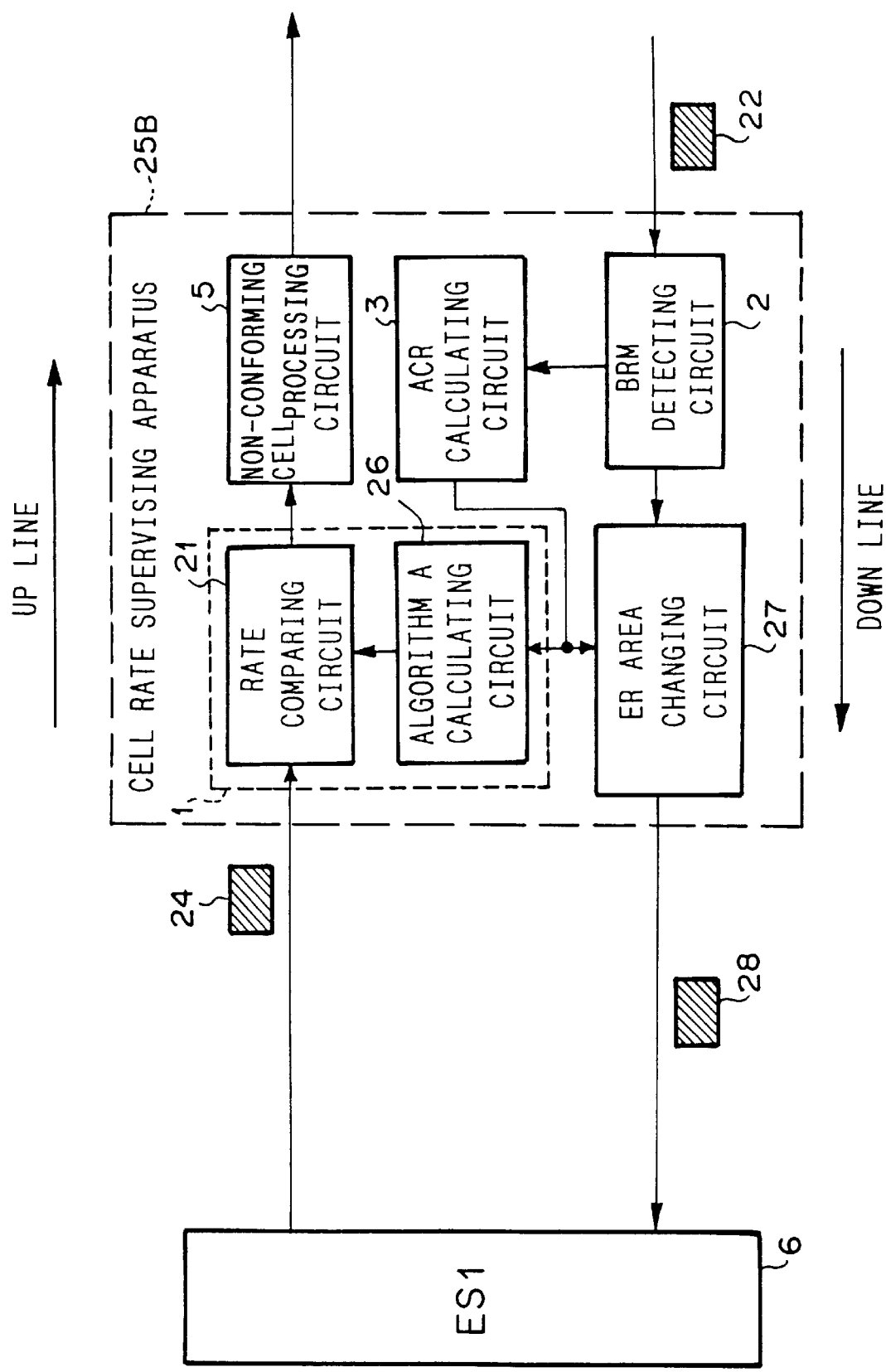
FIG. 2 is a block diagram showing the structure of a cell rate supervising apparatus according to a second embodiment of the present invention.

FIG. 2 is a block diagram showing the structure of a cell rate supervising apparatus according to a second embodiment of the present invention.

A cell rate supervising apparatus 25B according to this embodiment comprises a policing calculating circuit 1, a non-conforming cell processing circuit 5, a BRM cell detecting circuit 2, an ACR calculating circuit 3, and an ER area changing circuit 27. The policing calculating circuit 1 uses DGCRA and is composed of an algorithm A calculating circuit 26 and a rate comparing circuit 21. The algorithm A calculating circuit 26 is described in "Traffic Management Specification," The ATM Forum, Ver 4.0 R11, March 1996, Appendix III, p. 92.

The BRM cell detecting circuit 2 identifies the connection number of a cell received through the down line with the cell header and payload portion of the cell and determines whether or not the cell is a BRM cell. When the received cell is a BRM cell, the BRM cell detecting portion 2 reads the CI bit, NI bit, and ER area of the cell and outputs resultant signals to the ACR calculating circuit 3. On the other hand, the BRM cell detecting circuit 2 outputs a cell received through the down line to the ER area changing circuit 27 as it is.

The ACR calculating circuit 3 calculates the ACR value of the connection of a cell to be policed and passed through the cell rate supervising apparatus corresponding to the source operation provisions provided in "Traffic Management Specification," The ATM Forum, Ver 4.0 R11 or the rate control portion thereof. When the cell type signal determined by the BRM cell detecting circuit 2 is a BRM cell, the ACR calculating circuit 3 calculates the ACR value of the connection number of the BRM cell with the CI bit, NI bit, and ER area thereof.

The ER area changing circuit 27 sends a cell received from the BRM cell detecting circuit 2 to the down line in such a manner that cell intervals at the time that the BRM cell was received by the BRM cell detecting circuit 2 are kept and that the header portion and payload portion of the cell are not changed. Only when the cell is a BRM cell, the ER area changing circuit 27 creates a BRM cell 28 of which the ER area of the BRM cell is overwritten with the ACR value of the connection of the BRM cell received from the ACR calculating circuit 3 and sends the BRM cell 28 to the source side terminal unit through the down line.

The algorithm A calculating circuit 26 stores time tb of which a BRM cell is sent from the ER area changing circuit 27 through the down line. In addition, the algorithm A calculating circuit 26 stores an ACR value placed in the ER area of the BRM cell. When the BRM detecting circuit 2 receives a cell through the down line, the ACR calculating circuit 3 calculates the policing rate value PACR corresponding to the connection of the received cell with the stored tb and ACR values.

The rate comparing circuit 21 receives a cell from the up line and identifies the connection number with the cell header of the cell. The rate comparing circuit 21 detects the cell rate of the connection corresponding to the cell intervals of the received cells, compares the cell rate with the policing rate value PACR calculated by the algorithm A calculating circuit 26. When the cell rate is smaller than the PACR, the rate comparing circuit 21 determines that the received cell is a conforming cell. When the cell rate is larger than the PACR, the rate comparing 21 determines that the received cell is a non-conforming cell.

When the determined result of the rate comparing circuit 21 is a conforming cell, the non-conforming cell processing circuit 5 sends the cell to the network unit through the up line. When the determined result of the rate comparing circuit 21 is a non-conforming cell, the non-conforming cell processing circuit 5 changes the values of the CI bit of the cell to "1" and places a tag to the cell and sends the resultant cell to the network unit through the up line. Alternatively, the non-conforming cell processing circuit 5 discards the cell and sends a idle cell or the like instead thereof to the network unit through the up line.

Figure 3:
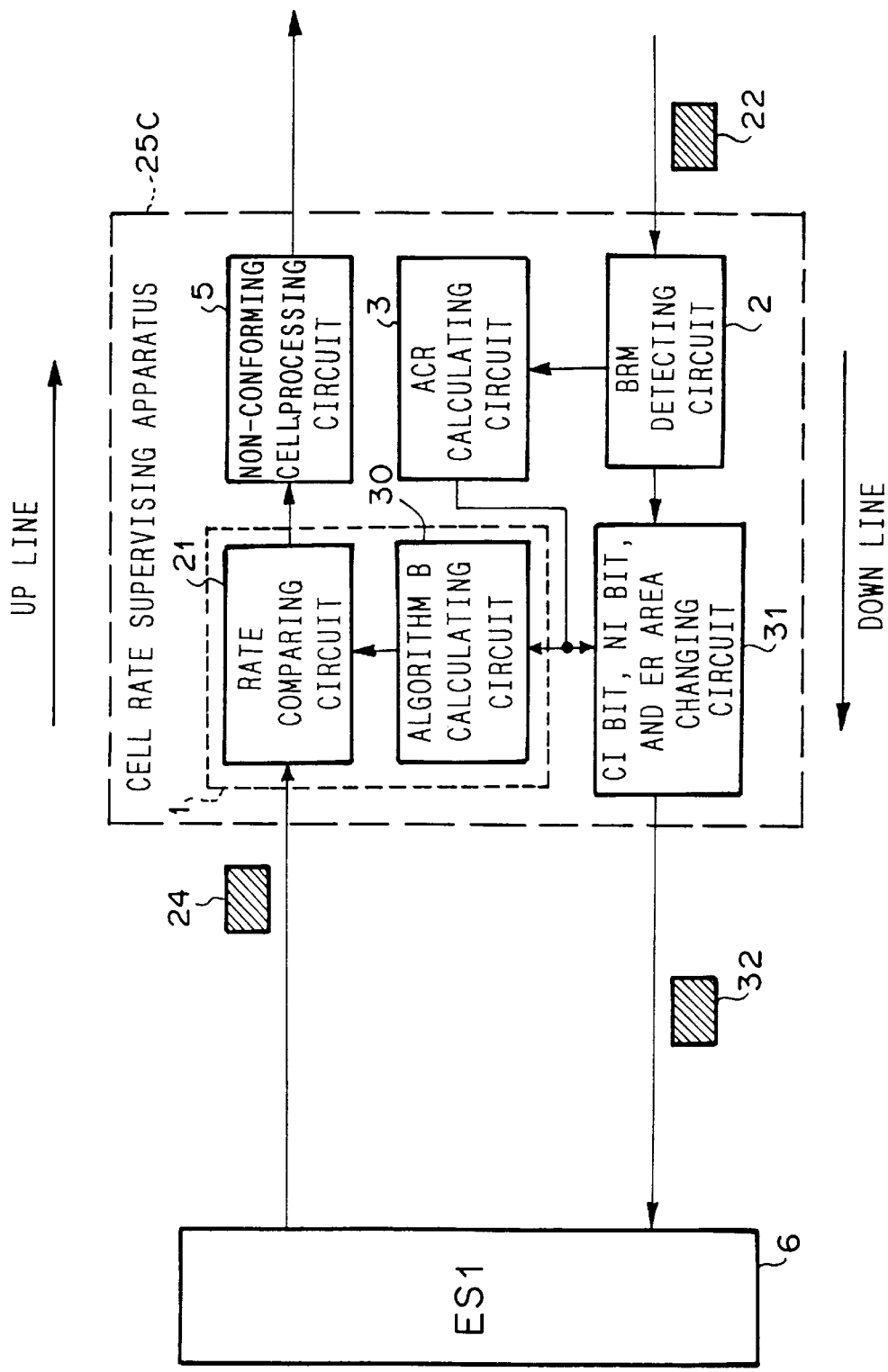
FIG. 3 is a block diagram showing the structure of a cell rate supervising apparatus according to a third embodiment of the present invention.

FIG. 3 is a block diagram showing the structure of a cell rate supervising apparatus according to a third embodiment of the present invention.

A cell rate supervising apparatus 25C according to this embodiment comprises a policing calculating circuit 1, a non-conforming cell processing circuit 5, a BRM cell detecting circuit 2, an ACR calculating circuit 3, and a CI bit, NI bit, and ER area changing circuit 31. The policing calculating circuit 1 uses DGCRA and is composed of an algorithm B calculating circuit 30 and a rate comparing circuit 21. The algorithm B calculating circuit 30 is described in "Traffic Management Specification," The ATM Forum, Ver 4.0 R11, March 1996, Appendix III, p. 92.

The operations of the BRM cell detecting circuit 2, the ACR calculating circuit 3, the rate comparing circuit 21, and the non-conforming cell processing circuit 5 of the third embodiment are the same as those of the second embodiment shown in FIG. 2. The algorithm B calculating circuit 30 calculates the policing rate PACR value of the connection of the cell with time tb of which a BRM cell is sent from the CI bit, NI bit, and ER area changing circuit 31 to the down line and the ACR value that is overwritten to the ER area of the BRM cell and stores the policing rate value PACR value of each connection. The BRM cell detecting circuit reads the PACR value of the connection of a received cell from the stored PACR values and sends the obtained PACR value to the rate comparing circuit 21.

As a feature of the third embodiment, the CI bit, NI bit, and ER area changing circuit 31 sends a cell received from the BRM cell detecting circuit 2 in such a manner that cell intervals at the time that the BRM cell was received by the BRM cell detecting circuit 2 are kept and that the header portion and payload portion of the cell are not changed. However, only when the cell is a BRM cell, the ACR value of the connection of the BRM cell received from the ACR calculating circuit 3 is overwritten to the ER area of the BRM cell. In addition, "0" is forcedly set to both or either the CI bit or the NI bit. The BRM cell is sent to the source side terminal unit through the down line. Thus, both or either the CI bit or the NI bit of the BRM cell 32 received from the CI bit, NI bit, and ER area changing circuit 31 is always "0."

Next, with reference to FIG. 4, the feature of the third embodiment will be described.

Figure 4:
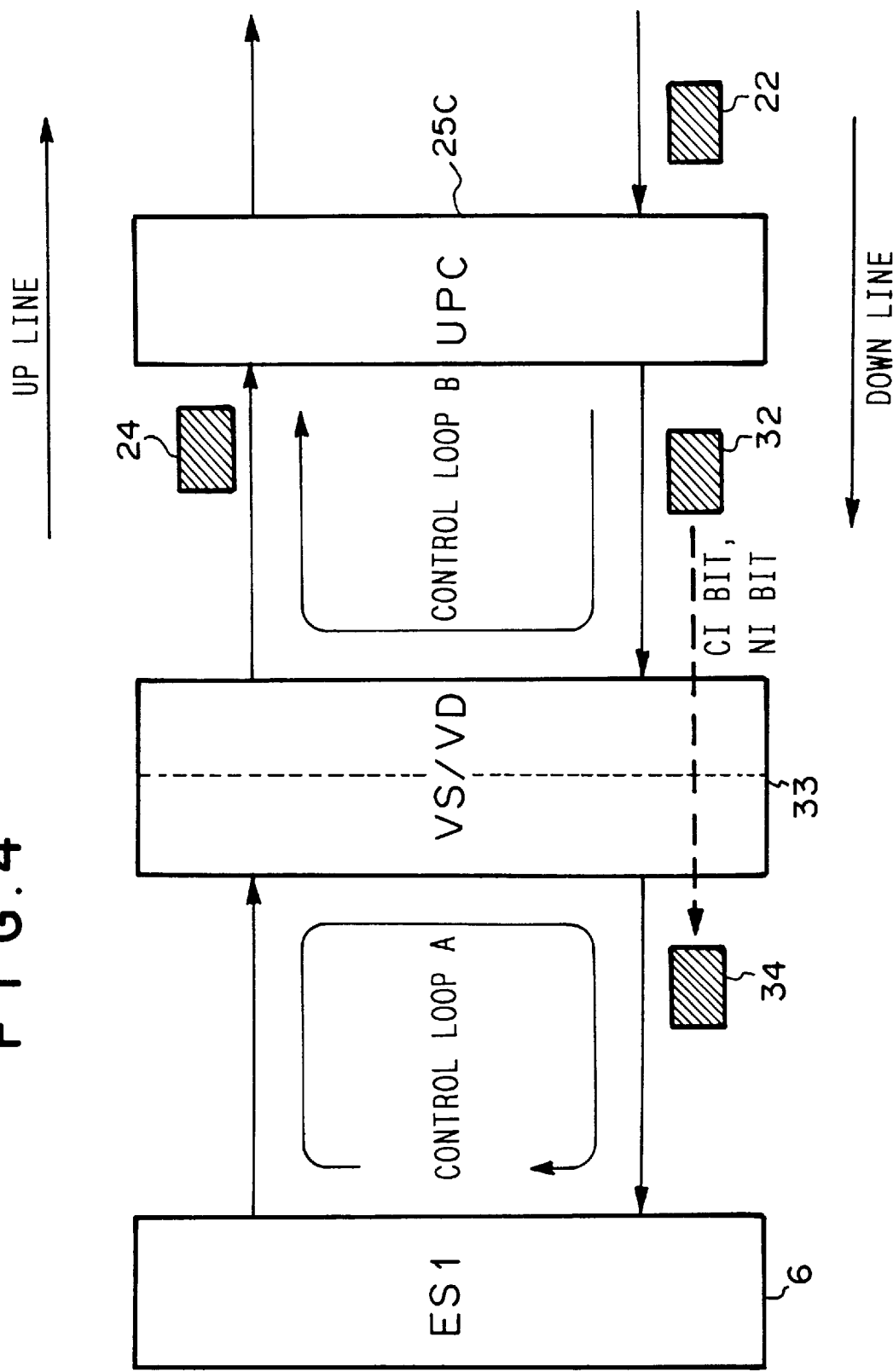
FIG. 4 is a schematic diagram for explaining the case that a VS/VD unit is disposed according to the present invention.
Figure 5:
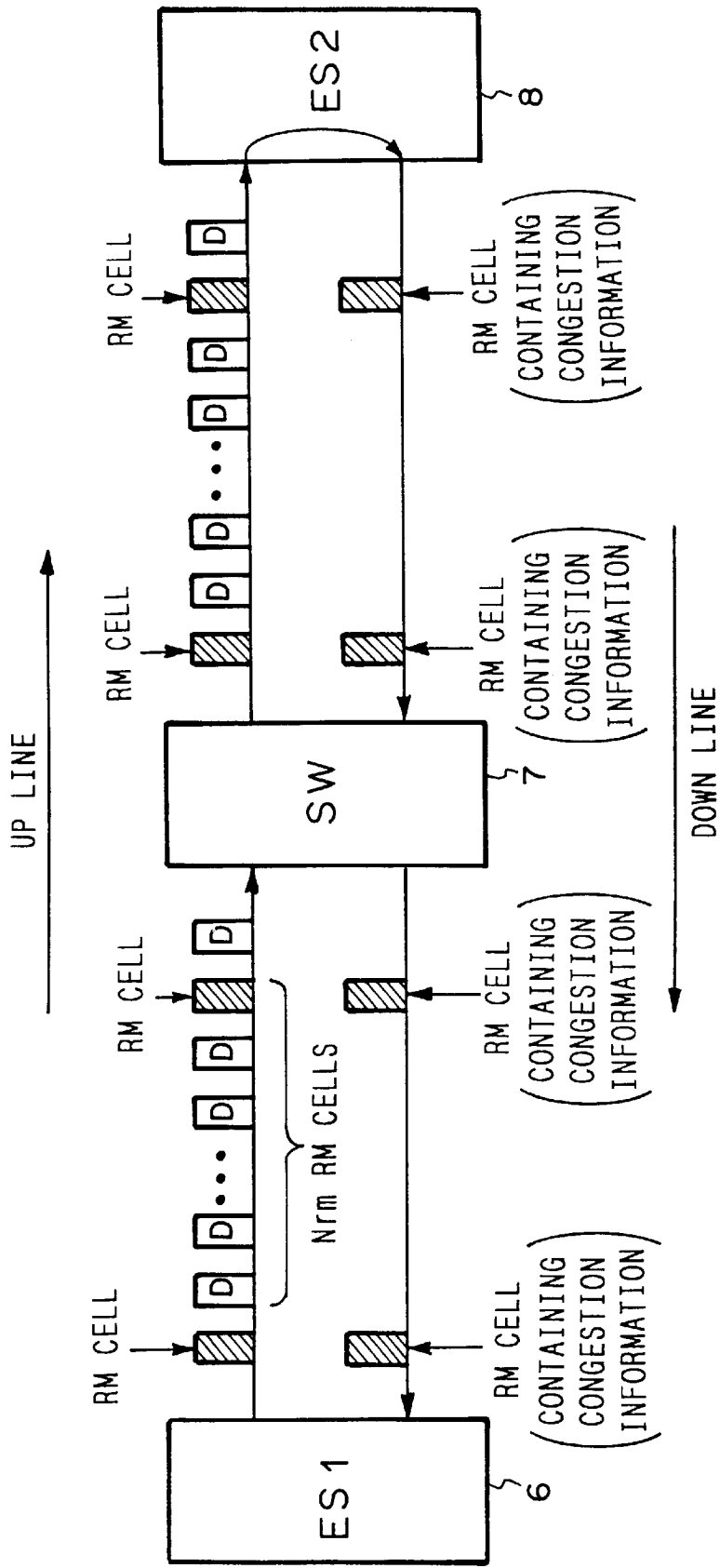
FIG. 5 is a schematic diagram for explaining a feedback method of congestion information from a network to a send termination unit in an ABR service.
Figure 6:
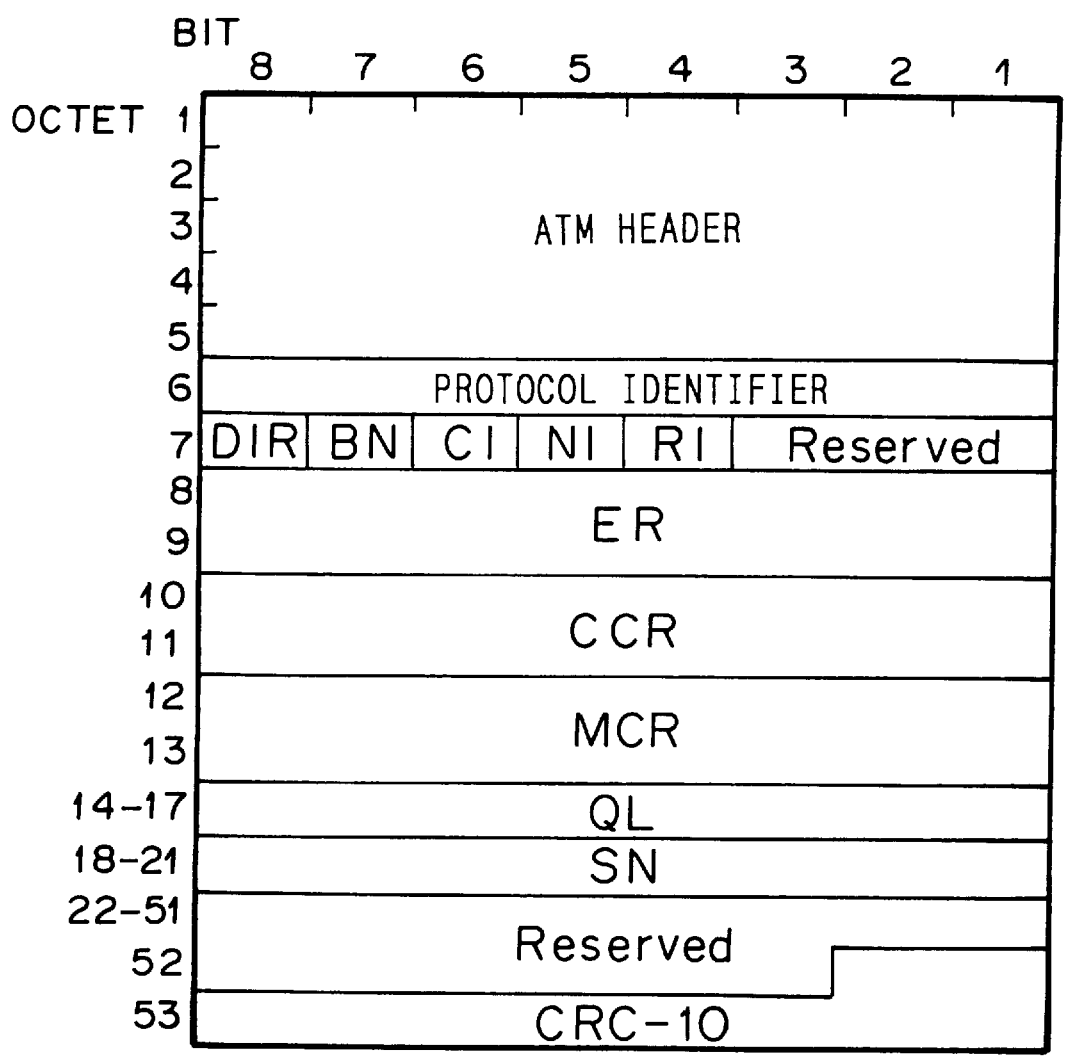
FIG. 6 is a schematic diagram showing a cell format of an RM cell in the ABR service.
Figure 7:
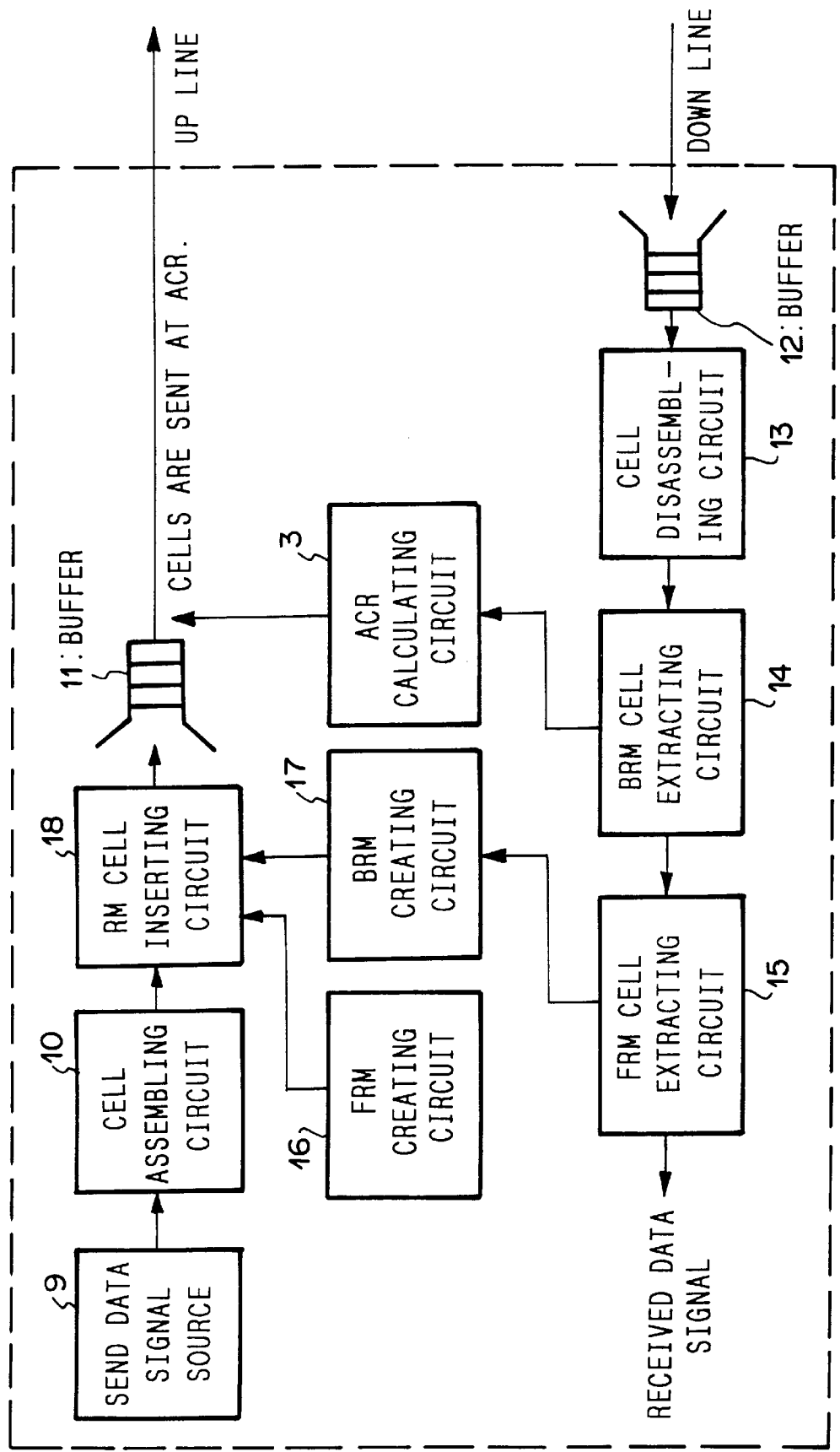
FIG. 7 is a block diagram showing an example of the structure of a sending/receiving terminal unit in the ABR service.
Figure 8:
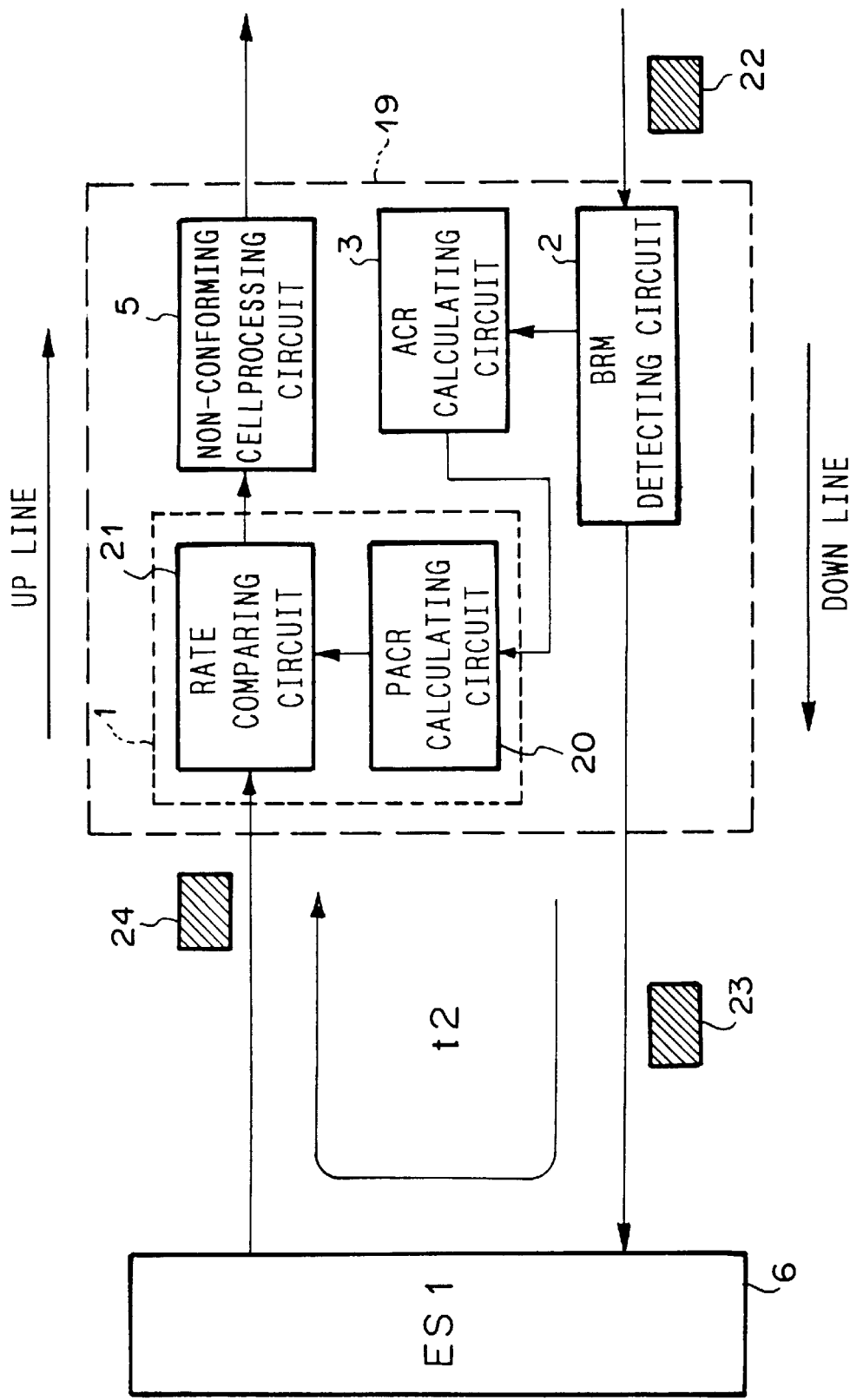
FIG. 8 is a schematic diagram for explaining an example of the structure of a cell rate supervising apparatus of a related art reference.

In FIG. 4, a VS/VD (Virtual Source/Virtual Destination) unit 33 is disposed between the user terminal unit (ES1) 6 and the cell rate supervising apparatus (UPC) 25C. Thus, the network is separated into a control loop A that controls a region between the user terminal unit 6 and the VS/VD unit 33 and a control loop B that controls a region between the VS/VD unit 33 and the network unit. Now, it is assumed that congestion takes place in the control loop B and that since the congestion is very slight, the VS/VD unit 33 absorbs the congestion, and that the congestion information is not sent to the user terminal unit 6.

In addition, it is assumed that the VS/VD unit 33 places information of the CI bit and NI bit of the BRM cell 32 of the control loop B to the CI bit and NI bit of the BRM cell 34 to be sent to the control loop A as it is.

Assuming that congestion information CI bit=1 has been placed in the BRM cell, since congestion information CI bit=1 is placed in the BRM cell 34, even if it is not necessary to send the congestion information CI bit 1 to the user terminal 6, the congestion information CI bit=1 is sent to the user terminal unit 6. Thus, since the user terminal unit 6 decreases the cell transmission rate, the throughput of the user terminal unit 6 does not rise and thereby the transmission efficiency deteriorates. The deterioration of the transmission efficiency also takes place when "1" as congestion information is placed in the NI bit.

However, when the cell rate supervising apparatus 25C sets "0" to the CI bit and NI bit and thereby the congestion information of the BRM cell 32 is only the ER area, even if the CI bit and NI bit of the BRM cell 34 are "0," the congestion information is only the ER area. Thus, congestion information of CI bit=1 and NI bit=1 is not unnecessarily sent to the user terminal unit 6. Consequently, the transmission efficiency of the user terminal unit 6 does not deteriorate.

In addition to DGCRA of which the algorithms A and B are used as the cell rate supervising method of the policing calculating circuit 1, the present invention can be applied to DGCRA that uses an algorithm other than the algorithms A and B and to the cell rate supervising system other than DGCRA.

As described above, according to the present invention, in the ABR service of the binary mode, even if a BRM cell is lost in a region on a down line between the cell rate supervising apparatus and the user terminal unit and thereby the policing rate value PACR of the cell rate supervising apparatus does not match the cell rate of the user terminal unit, the next BRM cell may allow the policing rate value PACR of the cell rate supervising apparatus to match the cell rate of the user terminal unit.

Thus, in the ABR service of the binary mode, the disadvantage of the network unit or the user terminal unit due to the situation of which an BRM cell is lost can be suppressed. Consequently, the transmission efficiency of the ABR service of the binary mode can be increased and the charging operation can be more accurately performed.

This is because absolute congestion information that is the ACR value calculated in the cell rate supervising apparatus is placed in the BRM cell and sent to the user terminal unit as well as relative congestion information that is the CI bit and NI bit. Thus, even if the ACR value calculated in the user terminal does not match the ACR value of the cell rate supervising apparatus due to the situation of which the BRM cell is lost, the absolute congestion information allows the ACR value of the user terminal unit to match the ACR value of the cell rate supervising apparatus. Thus, even if the policing rate becomes smaller than the cell transmission rate of the user terminal unit due to the situation of which the BRM cell is lost and thereby it is likely that the user is excessively charged, when the policing rate can be matched with the cell transmission rate, the number of non-conforming cells can be decreased. Consequently, the user can be suppressed from being excessively charged.

In addition, since a non-conforming cell can be discarded, the re-transmission of packets such as an IP packet can be suppressed. Thus, the information transmission efficiency can be prevented from decreasing.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A cell rate supervising apparatus for use with an ABR (Available Bit Rate) service of an ATM (Asynchronous Transfer Mode) network comprising:

a policing calculating circuit for policing a cell traffic of an up line connection from the user side to the network side;

a BRM cell detecting circuit for detecting a BRM (Backward Direction Resource Management) cell on a down line connection from the network side to the user side;

an ACR calculating circuit for calculating a rate value ACRP (Allowed Cell Rate) with a rate value of a CI (Congestion Identification) bit, an NI (No-increase) bit, and an ER (Explicit Rate) area that are congestion information received from said BRM cell Detecting circuit when said BRM cell detecting circuit detects the BRM cell;

a BRM cell changing circuit for overwriting the ER area of the BRM cell detected by said BRM cell detecting circuit with the rate value ACRp calculated by said ACR calculating circuit and sending cells including the overwritten BRM cell to the user terminal through the down line; and a non-conforming cell processing circuit for receiving the cell from said policing calculating circuit for performing a discarding and tag placing and for sending a confirming cell to the up line connection as a result of the policing calculation of said policing calculating circuit, wherein said policing calculating circuit determines a policing rate PACR (Policing Allowed Cell Rate) value with the ACRp value, the ACR value and performs a policing calculation for the received cell so as to determine whether a received cell is a conforming or non-conforming cell.

2. The cell rate supervising apparatus as set forth in claim wherein said BRM cell changing circuit sets "0" to both or either the CI bit or the NI bit of the BRM cell.

3. The cell rate supervising apparatus as set forth in claim 1, wherein said non-conforming cell processing circuit perform a discarding and tag-placing process for the non-conforming cell when the received cell is a non-conforming cell at said policing calculating circuit.

4. A cell rate supervising apparatus for use with an ABR (Available Bit Rate) service of an ATM network, comprising:

a policing calculating circuit using DGCRA (Dynamic Generic Cell Rate Algorithm) which is composed of an algorithm a calculating circuit and a rate comparing circuit;

a non-conforming cell processing circuit;

a BRM (Backward Resource Management) cell detecting circuit;

an ACR (Allowed Cell Rate) calculating circuit; and an ER (Explicit Rate) area changing circuit, wherein said BRM cell detecting circuit identified the connection number of a cell received on a down line in response to the cell header and payload portion of the cell, determines whether or not the cell is a BRM cell, reads an CI(Congestion Identification) bit, an NI (No-increase) bit, and an ER area of the received cell when the cell is the BRM cell, outputs resultant signals to said ACR calculating circuit, and outputs the cell received on the down line to said ER area changing circuit as it is;

wherein said ACR calculating circuit calculates an ACR value of the connection of a cell to be policed and passed through the cell rate supervising apparatus corresponding to predetermined source operation provisions provided in A "Traffic Management Specification," The ATM Forum, Ver 4.0 R11 or a rate control portion thereof, calculates the ACR value of the connection number of the BRM cell with the CI bit, and ER area of the cell when the cell detected by said BRM cell detecting circuit is a BRM cell, and outputs the calculated ACR value;

wherein said ER area changing circuit sends a cell received from said BRM cell detecting circuit in a manner which retains cell intervals occurring at the time that the BRM cell was received by said BRM cell detecting circuit and retains unchanged the header portion and the payload portion of the cell, creates the BRM cell of which the ACR value of the connection of the BRM cell received from said ACR calculating circuit to the ER area of the BRM cell only when the cell received from said BRM cell detecting circuit is the BRM cell, and sends the resultant BRM cell to a source side terminal unit through the down line;

wherein said algorithm A calculating circuit stores A time signal tb which indicates when the BRM cell is sent form said ER area changing circuit to the down line and the ACR value is placed in the ER area of the BRM cell and calculates a policing rate value PACR (Policing Allowed Cell Rate) of the connection of the received cell with the stored signal tb and ACR value when the cell is received by said rate comparing circuit through an up line;

wherein said rate comparing circuit receives the cell from the up line, identifies the connection number from the cell header of the cell, detects the cell rate of the connection with the cell intervals of the received cells of the connection, compares the cell rate with the policing rate value PACR calculated by said algorithm A calculating circuit,, determines that the received cell is a conforming cell when the cell rate is smaller than PACR, and determines that the received cell is a non-conforming cell when the cell rate is larger than PACR;

wherein said non-conforming cell processing circuit for receiving the cell from said policing calculating circuit sends the cell to the network unit through the up line when the determined result of said rate comparing circuit is a conforming cell, changes the value of the CI bit of the cell to "1", places a tag to the cell, and sends the resultant cell to the network unit through the up line or discards the cell and sends a idle cell or the like to the network unit through the up line when the determined result of said rate comparing circuit is a non-conforming cell.

5. A cell rate supervising apparatus for use with an ABR (Available Bit Rate) service of an ATM network, comprising:

a policing calculating circuit using DGCRA (Dynamic Generic Cell Rate algorithm) which is composed of an algorithm A calculating circuit and a rate comparing circuit;

a non-conforming cell processing circuit;

a BRM (Backward Resource Management) cell detecting circuit;

an ACR (Allowed Cell Rate) calculating circuit; and an ER (Explicit Rate) area changing circuit, wherein said BRM cell detecting circuit identifies the connection number of a cell received on a down line in response to the cell header and payload portion of the cell, determines whether or not the cell is a BRM cell, reads an CI (Congestion Identification) bit, an NI (No-increase) bit, and an ER area of the received cell when the cell is the BRM cell, outputs resultant signals to said ACR calculating circuit, and outputs the cell received on the down line to said ER area changing circuit as it is;

wherein said ACR calculating circuit calculates an ACR value of the connection of a cell to be policed and passed through the cell rate supervising apparatus corresponding to predetermined source operation provisions provided in the "Traffic Management Specification," The ATM Form, Ver 4.0 R11 or a rate control portion thereof, calculates the ACR value of the connection number of the BRM cell with the CI bit, NI bit, and ER area of the cell when the cell detected by said BRM cell detecting circuit is a BRM cell, and outputs the calculated ACR value;

wherein said CI bit, NI bit, and ER area changing circuit sends a cell to the down line in such a manner which retains cell intervals at the time that the BRM cell was received by the BRM cell detecting circuit 2 and retains unchanged the header potion and payload portion of the cell, overwrites the ACR value of the connection of the BRM cell received from said ACR calculating circuit to the ER area of the BRM cell, forcedly places "0" in to both or either the CI bit or the NI bit, and sends the resultant BRM cell to the source side terminal unit;

wherein said algorithm A calculating circuit calculates a policing rate PACR value of the connection of a BRM cell with the time signal tb of which the BRM cell is sent from said CI bit, NI bit, and ER area changing circuit to the down line and the ACR value is overwritten to the ER area of the BRM cell, stores the policing value PACR of each connection, reads the PACR value of the connection from the stores PACR values, and sends the obtained PACR value to said rate comparing circuit;

wherein said rate comparing circuit receives the cell from the up line, identifies the connection number with the cell header of the cell, detects the cell rate of the connection with the cell intervals of the received cells of the connection, compares the cell rate with the policing rate value PACR calculated by said algorithm A calculating circuit, determines that the received cell is a conforming cell when the cell rate is smaller than PACR, and determines that the received cell is a non-conforming cell when the cell rate is larger than PACR, and wherein said non-conforming cell processing circuit receives the cell from said policing calculating circuit and sends the cell to the network unit through the up line when the determined result of said rate comparing circuit is a conforming cell, changes the value of the CI bit of the cell to "1", places a tag in the cell, and sends the resultant cell to the network unit through the up line or discards the cell and sends a idle cell or the like to the network unit through the up line when the determined result of said rate comparing circuit is a non-conforming cell.

6. A cell rate supervising apparatus for use with an ABR (Available Bit Rate) service of an ATM network, comprising:

a policing calculating circuit using DGCRA (Dynamic Generic Cell Rate Algorithm) which is composed of an algorithm B calculating circuit and a rate comparing circuit;

a non-conforming cell processing circuit;

a BRM (Backward Resource Management) cell detecting circuit;

an ACR (Allowed Cell Rate) calculating circuit; and an ER (Explicit Rate) area changing circuit;

wherein said BRM cell detecting circuit identifies the connection number of a cell received on a down line with the cell header and payload portion of the cell, determines whether or not the cell is a BRM cell, reads an CI (Congestion Identification) bit, an NI (No-Increase) bit, and an ER area of the received cell when the cell is the BRM cell, outputs resultant signals to said ACR calculating circuit, and outputs unchanged the cell received on the down line to said ER are changing circuit [as it is;

wherein said ER area changing circuit sends a cell received from said BRM cell detecting circuit in a manner that retains cell intervals existing at the time that the BRM cell was received by said BRM cell detecting circuit and retains unchanged the header portion and the payload portion of the cell, creates the BRM cell of which the ACR value of the connection of the BRM cell received from said ACR calculating circuit to the ER area of the BRM cell only when the cell received from said ACR calculating circuit to the ER area of the BRM cell only when the cell received from said BRM cell detecting circuit is the BRM cell, and sends the resultant BRM cell to the source side terminal unit through the down line;

wherein said algorithm B calculating circuit stores time tb of which the BRM cell is sent from said ER area changing circuit to the down line and the ACR value placed in the ER are of the BRM cell and calculates a policing rate value PACR (Policing Allowed Cell Rate) of the connection of the received cell with a stored signal tb and ACR value when the cell is received by said rate comparing circuit through the up line;

wherein said rate comparing circuit receives the cell from an up line, identifies the connection number with the cell header of the cell, detects the cell rate of the connection with the cell intervals of the received cells of the connection, compares the cell rate with the policing rate value PACR calculating by said algorithm B calculating circuit, determines that the received cell is a conforming cell when the cell rate is smaller than PACR, and determines that the received cell is a non-conforming cell when the cell rate is larger than PACR; and wherein said non-conforming cell processing circuit receives the cell from said policing calculating circuit for discarding and tag placing and sends the cell to the network unit through the up line when the determined result of said rate comparing circuit is a conforming cell, changes the value of the CI bit of the cell to "1", places a tag into the cell, and sends the resultant cell to the network unit through the up line or discards the cell and sends a idle cell or the like to the network unit through the up line when the determined result of said rate comparing circuit is a non-conforming cell.

7. A cell rate supervising apparatus for use with and ABR (Available Bit Rate) service of an ATM network, comprising:

a policing calculating circuit using DGCRA (Dynamic Generic Cell Rate Algorithm) which is composed of an algorithm B calculating circuit and a rate comparing circuit;

a non-conforming cell processing circuit;

a BRM (Backward Resource Management) cell detecting circuit;

an ACR (Allowed Cell Rate) calculating circuit; and an ER (Explicit Rate) area changing circuit;

wherein said BRM cell detecting circuit identifies the connection number of a cell received on a down line in response to a cell header and payload portion of the cell, determines whether or not the cell is a BRM cell, reads an CI (Congestion Identification) bit, an NI (No-Increase) bit, and an ER area of the received cell when the cell is the BRM cell, outputs resultant signals to said ACR calculating circuit, and outputs the cell as received on the down line to said ER are changing circuit;

wherein said ACR calculating circuit calculates an ACR value of the connection of a cell to be policed and passed through the cell rate supervising apparatus corresponding to predetermined source operation provisions provided in a "Traffic Management Specification," The ATM Form, Ver 4.0 R11 or a rate control portion thereof, calculates the ACR value of the connection number of the BRM cell with the CI bit, NI bit, and ER area of the cell when the cell detected by said BRM cell detecting circuit is a BRM cell, and outputs the calculated ACR value;

wherein said CI bit, NI bit, and ER area changing circuit sends a cell to the down line in such a manner that cell intervals at the time that the BRM cell was received by the BRM cell detecting circuit 2 are kept and that the header potion and payload portion of the cell are not changed, overwrites the ACR value of the connection of the BRM cell received from said ACR calculating circuit to the ER area of the BRM cell, forcedly places "0" to both or either the CI bit or the NI bit, and sends the resultant BRM cell to the source side terminal unit;

wherein said algorithm B calculating circuit calculates a policing rate PACR value of the connection of a BRM cell with a time signal tb of which the BRM cell is sent form CI bit, NI bit, and ER area changing circuit to the down line and the ACR value overwritten to the ER area of the BRM cell, stores the policing value PACR of the connection, reads the PACR value of the connection from the stores PACR values, and send the obtained PACR value to said rate comparing;

wherein said rate comparing circuit receives the cell from the up line, identifies the connection number with the cell header of the cell, detects the cell rate of the connection with the cell intervals of the received cells of the connection, compares the cell rate with the policing rate value PACR calculated by said algorithm B calculating circuit, determines that the received cell is a conforming cell when the cell rate is smaller than PACR, and determines that the received cell is a non-conforming cell when the cell rate is larger than PACR; and wherein said non-conforming cell processing circuit for receiving the cell from said policing calculating circuit sends the cell to the network unit through the up line when the determined result of said rate comparing circuit is a conforming cell, changes the value of the CI bit of the cell to "1"l places a tag into the cell, and sends the resultant cell to the network unit through the up line or discards the cell and sends a idle cell or the like to the network unit through the up line when the determined result of said rate comparing circuit is a non-conforming cell.

8. A cell rate supervising apparatus for use with an ABR (Available Bit Rate) service of an ATM network, comprising:

a VS/VD (Virtual Source/Virtual Destination) unit disposed between a user terminal unit (ES1) and a cell rate supervising apparatus (UPC);

a control loop A that controls a region between the user terminal unit and the VS/VD unit; and a control loop B that controls a region between the VS/VD unit and the network unit;

wherein if congestion takes place in the control loop B and the congestion is very slight, the VS/VD unit absorbs the congestion, and that the congestion information is not sent to the user terminal unit;

wherein if the VS/VD unit places information of the CI (Congestion Identification) bit and NI (No Increase) bit of the BRM (Backward resource Management) cell of the control loop B to the CI bit and NI bit of the BRM cell to be sent to the control loop A, when the cell rate supervising apparatus sets "0" to the CI bit and the NI bit and thereby the congestion information of the BRM cell is only the ER area, even if the CI bit and NI bit of the BRM cell are "0," the congestion information is only the ER area, congestion information of CI bit=1 is not unnecessarily sent to the user terminal unit, and the transmission efficiently of the user terminal unit does not deteriorate.

* * * * *

UNITED STATES PATENT AND TRADEMARK OFFICE
CERTIFICATE OF CORRECTION

PATENT NO. : 6,084,857
DATED : July 4, 2000
INVENTOR(S) : Toru Takamichi

It is certified that error appears in the above-identified patent and that said Letters Patent is hereby corrected as shown below:

Column 13, line 13, after "in claim" and insert --1--

Column 15, line 64, delete "[as it is"

Signed and Sealed this

Seventeenth Day of April, 2001

Attest:

NICHOLAS P. GODICI

Attesting Officer     Acting Director of the United States Patent and Trademark Office